United States Patent
Hagiwara et al.

(10) Patent No.: US 8,842,825 B2
(45) Date of Patent: Sep. 23, 2014

(54) DATA ENCODING APPARATUS, DATA ENCODING METHOD, DATA ENCODING PROGRAM, AND RECORDING MEDIUM

(75) Inventors: Atsushi Hagiwara, Kanagawa (JP); Naoya Morita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1986 days.

(21) Appl. No.: 11/671,767

(22) Filed: Feb. 6, 2007

(65) Prior Publication Data

US 2007/0206788 A1    Sep. 6, 2007

(30) Foreign Application Priority Data

Feb. 10, 2006   (JP) .................................. 2006-034264

(51) Int. Cl.
*H04K 1/00* (2006.01)
*G06F 21/80* (2013.01)
*G06F 21/85* (2013.01)

(52) U.S. Cl.
CPC ........ *G06F 21/85* (2013.01); *G06F 2221/2107* (2013.01); *G06F 21/80* (2013.01)
USPC ................ 380/37; 380/44; 380/201; 713/193

(58) Field of Classification Search
None
See application file for complete search history.

(56) References Cited

U.S. PATENT DOCUMENTS

| | | | |
|---|---|---|---|
| 6,023,780 A | 2/2000 | Iwatani | |
| 6,247,157 B1 * | 6/2001 | Edirisooriya | ................ 714/767 |
| 7,298,845 B2 * | 11/2007 | Tatebayashi et al. | ......... 380/201 |
| 7,885,512 B2 * | 2/2011 | Takashima et al. | ........... 386/248 |
| 2003/0070083 A1 | 4/2003 | Nessler | |

FOREIGN PATENT DOCUMENTS

| | | |
|---|---|---|
| JP | 2002-152193 | 5/2002 |
| JP | 2002-268327 | 9/2002 |
| JP | 2003-59178 | 2/2003 |
| JP | 2004-106207 | 4/2004 |

* cited by examiner

*Primary Examiner* — Kaveh Abrishamkar

(74) *Attorney, Agent, or Firm* — Oblon, Spivak, McClelland, Maier & Neustadt, L.L.P.

(57) ABSTRACT

A disclosed data encoding apparatus includes: an arbitrary number of storage units; a data transfer control unit dividing input data into data blocks in accordance with the arbitrary number of storage units and transferring the data blocks to each storage unit; and encoding units having the same number as the storage units, the encoding units encoding the data blocks using a different cryptographic key for each storage unit while the data blocks are transferred by the data transfer control unit, wherein each storage unit stores the data blocks encoded by the encoding units.

12 Claims, 12 Drawing Sheets

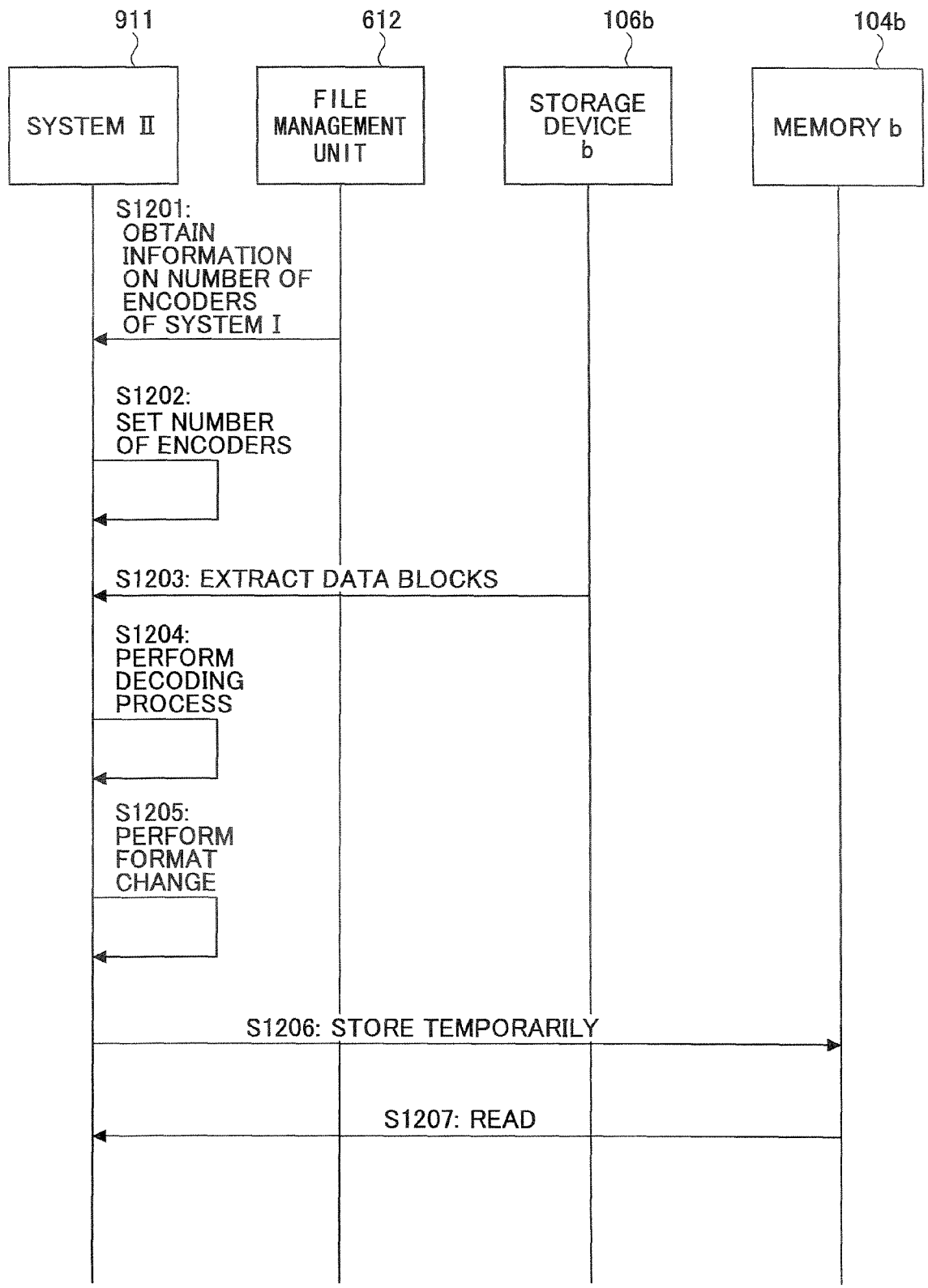

DATA ENCODING APPARATUS, DATA ENCODING METHOD, DATA ENCODING PROGRAM, AND RECORDING MEDIUM

BACKGROUND OF THE INVENTION

1. Field of the Invention

The present invention relates to a data encoding apparatus for encoding data, a data encoding method, a data encoding program, and a recording medium.

2. Description of the Related Art

Conventionally, in the field of data storage devices provided with plural storage devices, various types of devices for maintaining security of stored data have been proposed. Examples of devices having a unit for maintaining the security of data include data storage devices in which removal of a storage device where data is stored is simply prohibited. In these data storage devices, a data leakage by a third person and an unexpected removal of a storage device can be prevented using a simple configuration (refer to Patent Document 1 below, for example).

Further, other examples of devices having a unit for maintaining the security of data include data storage devices provided with an encoder. In the data storage devices provided with such an encoder, cryptographic keys are created in accordance with random numbers generated by a random number generator connected to the encoder. And the encoder encodes data by using the cryptographic key (refer to Patent Documents 2 and 3)

Patent Document 1: Japanese Laid-Open Patent Application No. 2004-106207

Patent Document 2: Japanese Laid-Open Patent Application No. 2003-059178

Patent Document 3: Japanese Laid-Open Patent Application No. 2002-152193

However, in the technique disclosed in the above-mentioned Patent Document 1, it is possible to view contents of data stored in the storage device through communication without directly removing the storage device, for example. Thus, this is problematic in that the security of data cannot be maintained.

Further, in the technique disclosed in the above-mentioned Patent Document 2 or 3, although the security of data is maintained in communication and the like by encoding data, one encoder encodes data from plural storage devices, encoding and decoding takes time when an amount of data is large.

Moreover, the random number generator disposed on the encoder does not generate random numbers for each storage device. Accordingly, when a method for generating random numbers is revealed, all the data distributed in the plural storage devices is decoded. In this manner, it is highly likely that when one code is decoded, all the cryptographic keys are decrypted. In addition, the encoder always uses managed cryptographic keys even for temporary operations, so that when the cryptographic keys are decrypted, all the temporary operations may be intercepted by a third person. Thus, it is difficult to maintain the security of data when one encoder is disposed on the data storage device.

SUMMARY OF THE INVENTION

It is a general object of the present invention to provide an improved and useful data encoding apparatus, data encoding method, data encoding program, and recording medium in which the above-mentioned problems are eliminated.

A more specific object of the present invention is to provide a data encoding apparatus, data encoding method, data encoding program, and recording medium that can improve efficiency of encoding while enhancing security by encoding distributed data using plural encoders.

According to one aspect of the present invention, there is provided a data encoding apparatus comprising: an arbitrary number of storage units; a data transfer control unit dividing input data into data blocks in accordance with the arbitrary number of storage units and transferring the data blocks to each storage unit; and encoding units having the same number as the storage units, the encoding units encoding the data blocks using a different cryptographic key for each storage unit while the data blocks are transferred by the data transfer control unit, wherein each storage unit stores the data blocks encoded by the encoding units.

According to another aspect of the present invention, in the above-mentioned data encoding apparatus, the encoding unit includes: a random number generating unit creating a cryptographic key by generating random numbers for each storage unit.

According to another aspect of the present invention, there is provided a data encoding apparatus comprising: an arbitrary number of encoding units; a storage unit; a data allocation unit allocating input data to data blocks in accordance with the arbitrary number of encoding units encoding the data blocks using a different cryptographic key, the data blocks being allocated by the data allocation unit; and a data transfer control unit transferring the data blocks to the storage unit, the data blocks being encoded by the encoding units, wherein the storage unit stores the data blocks transferred by the data transfer control unit.

According to another aspect of the present invention, in the above-mentioned data encoding apparatus, the number of the storage units is arbitrary, and the data transfer control unit transfers the data blocks in a predetermined data block unit to each storage unit in accordance with the number of the storage units.

According to another aspect of the present invention, the above-mentioned data encoding apparatus includes: an information obtainment unit obtaining information of other data encoding apparatus; a judgment unit judging, in an encoding procedure included in the information, whether a sequence of the data blocks of the data encoding apparatus corresponds to a sequence of data blocks of the other data encoding apparatus based on the information of the other data encoding apparatus obtained by the information obtainment unit; and a reception unit receiving the data blocks encoded by the other data encoding apparatus, wherein the data transfer control unit transfers the information obtained by the information obtainment unit and the data blocks received by the reception unit to the storage unit without change when the judgment unit judges that the sequence of the data blocks of the data encoding apparatus corresponds to the sequence of the data blocks of the other data encoding apparatus.

According to another aspect of the present invention, the above-mentioned data encoding apparatus includes: a format change unit changing the sequence of the data blocks received by the reception unit when the judgment unit judges that the sequence of the data blocks of the data encoding apparatus is different from the sequence of the data blocks of the other data encoding apparatus.

According to another aspect of the present invention, there is provided a data encoding method comprising the steps of: data transfer control for dividing input data into data blocks in accordance with an arbitrary number of storage units and transferring the data blocks to each storage unit; data encoding for encoding the data blocks using a different cryptographic key for each storage unit while the data blocks are transferred in the data transfer control; and data storing for storing each of the data blocks encoded in the data encoding in the arbitrary storage units.

According to another aspect of the present invention, there is provided a data encoding method comprising the steps of: data allocation for allocating input data to data blocks in accordance with an arbitrary number of encoding units; data encoding for encoding the data blocks using a different cryptographic key, the data blocks being allocated in the data allocation; data transfer control for transferring the data blocks encoded in the data encoding to a storage unit; and data storing for storing the data blocks transferred in the data transfer control in the storage unit.

According to another aspect of the present invention, there is provided a computer-readable data encoding program which, when executed by a computer, causes the computer to perform the encoding process according to one of the above-mentioned methods.

According to another aspect of the present invention, there is provided a computer-readable recording medium on which the above-mentioned computer-readable data encoding program is recorded.

According to the data encoding apparatus, data encoding method, data encoding program, and recording medium of the present invention, it is possible to improve efficiency of encoding while enhancing security by encoding divided data using plural encoders.

Other objects, features and advantage of the present invention will become more apparent from the following detailed description when read in conjunction with the accompanying drawings.

BRIEF DESCRIPTION OF THE DRAWINGS

FIG. 12 is a sequence diagram showing a process for decoding data blocks transferred from system 1 while encoded.

DETAILED DESCRIPTION OF THE PREFERRED EMBODIMENTS

In the following, embodiments of a data encoding apparatus, data encoding method, data encoding program, and recording medium of the present invention will be described in detail with reference to the accompanying drawings.

Embodiment 1

[Example of a Configuration of a Data Encoding Apparatus According to Embodiment 1]

Figure 1:
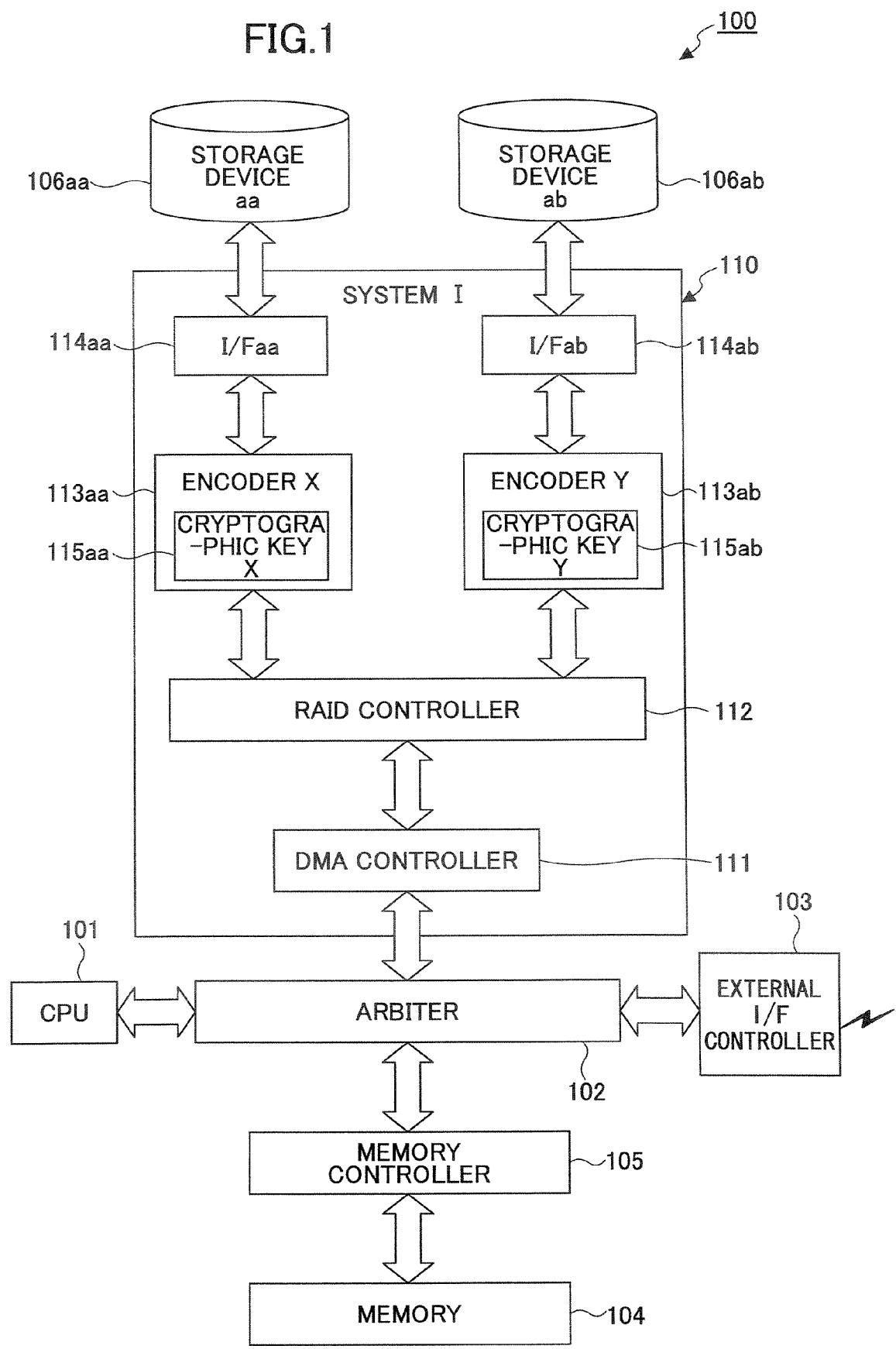
FIG. 1 is an illustration showing an example of a configuration of a data encoding apparatus according to embodiment 1.

First, an example of a configuration of a data encoding apparatus 100 according to embodiment 1 of the present invention is described. FIG. 1 is an illustration showing the example of the configuration of the data encoding apparatus 100 according to embodiment 1. In FIG. 1, the data encoding apparatus 100 according to embodiment 1 includes a CPU (Central Processing Unit) 101, an arbiter 102, an external I/F controller 103, a memory 104, a memory controller 105, a storage device aa 106aa, a storage device ab 106ab, and a system I 110. Each of the constituent elements 101 to 110 is connected via a bus. The system I 110 includes a DMA (Direct Memory Access) controller 111, a RAID (Redundant Array of Independent Disk) controller 112, an encoder X 113aa, an encoder Y 113ab, an I/F aa 114aa, and an I/F ab 114ab. In addition, the number of storage devices is arbitrary and the encoder and the I/F are disposed for each storage device.

The CPU 101 is connected to the arbiter 102. The CPU 101 uses the memory 104 as a work area and controls an entire portion of the data encoding apparatus 100 by executing various types of programs recorded in a ROM (Read Only Memory) not shown in the drawings.

The external I/F controller 103 is connected to an external device via a cable and functions as an interface between the external device and the data encoding apparatus 100. The external I/F controller 103 is also connected to a network via radio communication and functions as an interface between the external device and the data encoding apparatus 100. Further, the external I/F controller 103 is connected to a communication network such as the Internet via radio communication and functions as an interface between the communication network and the data encoding apparatus 100.

The memory 104 is connected to the memory controller 105. The memory controller 105 is connected to the arbiter 102, receives directions from the arbiter 102, and also receives directions from a device (constituent element) specified by the arbiter 102, the device being connected via the bus. The specified device accesses the memory 104 via the memory controller 105. Requests from the device selected by the arbiter 102 are transmitted to the memory controller 105 where the memory controller 105 generates a timing signal necessary to access the memory 104. Finally, the device accesses the memory 104.

Specifically, the memory 104 temporarily stores data input from the external I/F controller 103, for example, before transferring the data to the storage device aa 106aa and the storage device ab 106ab. The memory 104 temporarily stores data read out from the storage device aa 106aa and the storage device ab 106ab before outputting the data from the external I/F controller 103.

The DMA controller 111 is connected to the arbiter 102. The DMA controller 111 is capable of transferring data between the memory 104 and the device without using the CPU 101. Specifically, when data temporarily stored in the memory 104 is transferred to the RAID controller 112, for example, the DMA controller 111 is capable of transferring the data in a direct manner without using the CPU 101. In accordance with this, the DMA controller 111 is capable of improving a data transfer speed and reducing a load on the CPU 101.

The storage device aa 106*aa* and the storage device ab 106*ab* are constructed using a storage medium and a storage medium drive. The storage medium drive controls data reading/writing on a storage medium in accordance with control of the CPU 101. The storage medium stores the data written by the control of the storage medium drive. The data may be distributed. Examples of the storage medium include HD (Hard Disk) and examples of the storage medium drive include HD drives. The number of storage devices is arbitrary and FIG. 1 describes a case where two devices of the storage device aa 106*aa* and the storage device ab 106*ab* are disposed.

The RAID controller 112 realizes a data transfer control function for dividing data blocks in a predetermined unit in accordance with the number of storage devices and transferring the divided data blocks to each storage device. Specifically, the RAID controller 112 directly receives data from the memory 104 through the DMA controller 111, the data being temporarily stored in the memory 104, and divides data blocks in a predetermined unit in accordance with the number of storage devices. Then, the RAID controller 112 transfers the divided data blocks to each storage device.

The encoder X 113*aa* and the encoder Y 113*ab* each realizes an encoding function for encoding with the use of different cryptographic keys. In FIG. 1, the encoder X 113*aa* performs encoding using a cryptographic key X 115*aa* and the encoder Y 113*ab* performs encoding using a cryptographic key Y 115*ab*. The encoder X 113*aa* is connected to the storage device aa 106*aa* via the I/F aa 114*aa*. And the encoder Y 113*ab* is connected to the storage device ab 106*ab* via the I/F ab 114*ab*.

Next, an encoding procedure of the data encoding apparatus 100 is described. First, data input is received in the external I/F controller 103. The memory 104 temporarily stores the received data through control of the memory controller 105. Then, the DMA controller 111 transfers the temporarily stored data to the RAID controller 112 without using the CPU 101. The RAID controller 112 divides data blocks in a predetermined unit in accordance with the number of storage devices and transfers the divided data blocks to each storage device. In this case, while the data blocks are transferred from the RAID controller 112 to the storage devices, the data blocks pass through the encoders. When the encoders receive the data blocks, each encoder uses each cryptographic key and encodes the data blocks. Then, the storage devices store the encoded data blocks.

As mentioned above, when the data blocks are transferred to the storage devices, the encoder is connected for each storage device, so that it is possible to reduce time for encoding the data. Further, the data blocks to be stored in the storage devices are divided by the RAID controller 112 in a predetermined unit in accordance with the number of storage devices and then the divided data blocks are encoded. Thus, the encoders perform encoding using each cryptographic key for each storage device, so that it is possible to improve the security of data.

A decoding procedure of the data encoding apparatus 100 is performed in reverse order of the encoding procedure. When the data encoding apparatus 100 receives a decoding request, the RAID controller 112 sequentially extracts the data blocks stored in each storage device. While the data blocks are transferred from the storage devices to the RAID controller 112, the data blocks pass through the encoders. When the encoders receive the data blocks, each encoder decodes the data blocks using each cryptographic key. Accordingly, the decoded data blocks are sequentially collected in the RAID controller 112. Thus, the data collected in the RAID controller 112 is read out as pre-encoded data.

[Example of the Data Encoding Apparatus Provided with a Random Number Generator]

Figure 2:
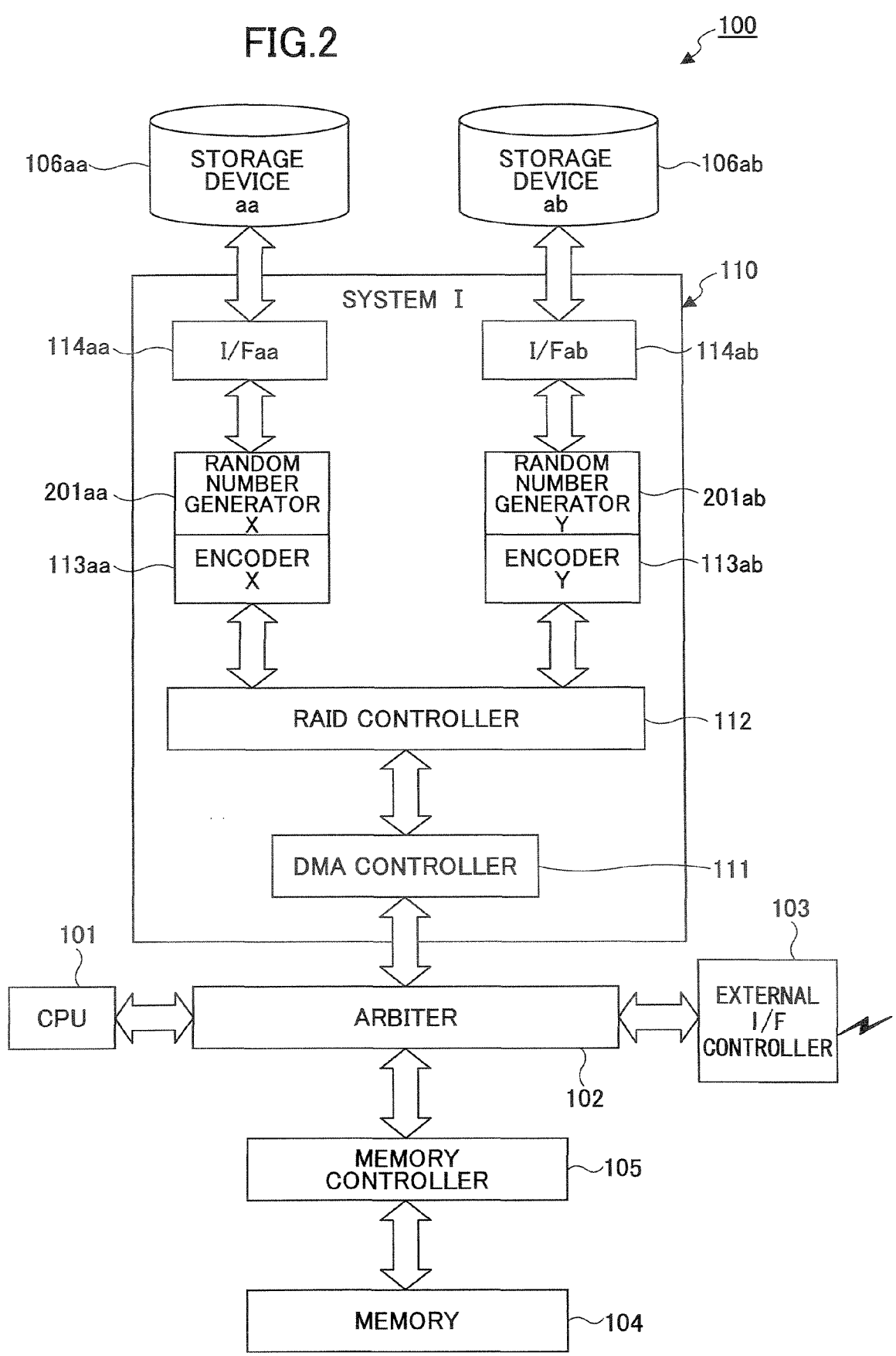
FIG. 2 is an illustration showing an example of a data encoding apparatus provided with a random number generator.

Next, a case where the data encoding apparatus 100 is provided with a random number generator is described. FIG. 2 is an illustration showing an example of a data encoding apparatus provided with a random number generator. The random number generator is disposed on each encoder. In FIG. 2, a random number generator X 201*aa* is disposed on the encoder X 113*aa* and a random number generator Y 201*ab* is disposed on the encoder Y 113*ab*. When different initial values are set in the random number generators, each random number generator generates different random numbers. Thus, the encoders create cryptographic keys using random numbers generated by the random number generators connected to each encoder and encode the data blocks using the created cryptographic keys.

The random number generators also generate random numbers for overwriting data stored in the storage devices so as to erase the data. In this case, the data is not erased through a normal "delete" command but is subjected to random writing such that the data cannot be restored. The random writing refers to overwriting data using random numbers so as to completely erase contents of data. In addition, the random number generator generates random numbers and erases data, the random numbers differing from those generated for creating the cryptographic key. Thus, different random numbers are used for encoding data and for erasing data, so that it is unlikely that the cryptographic keys used for encoding data are decrypted.

[Procedure of a Data Encoding Process Performed on Operations]

Figure 3:
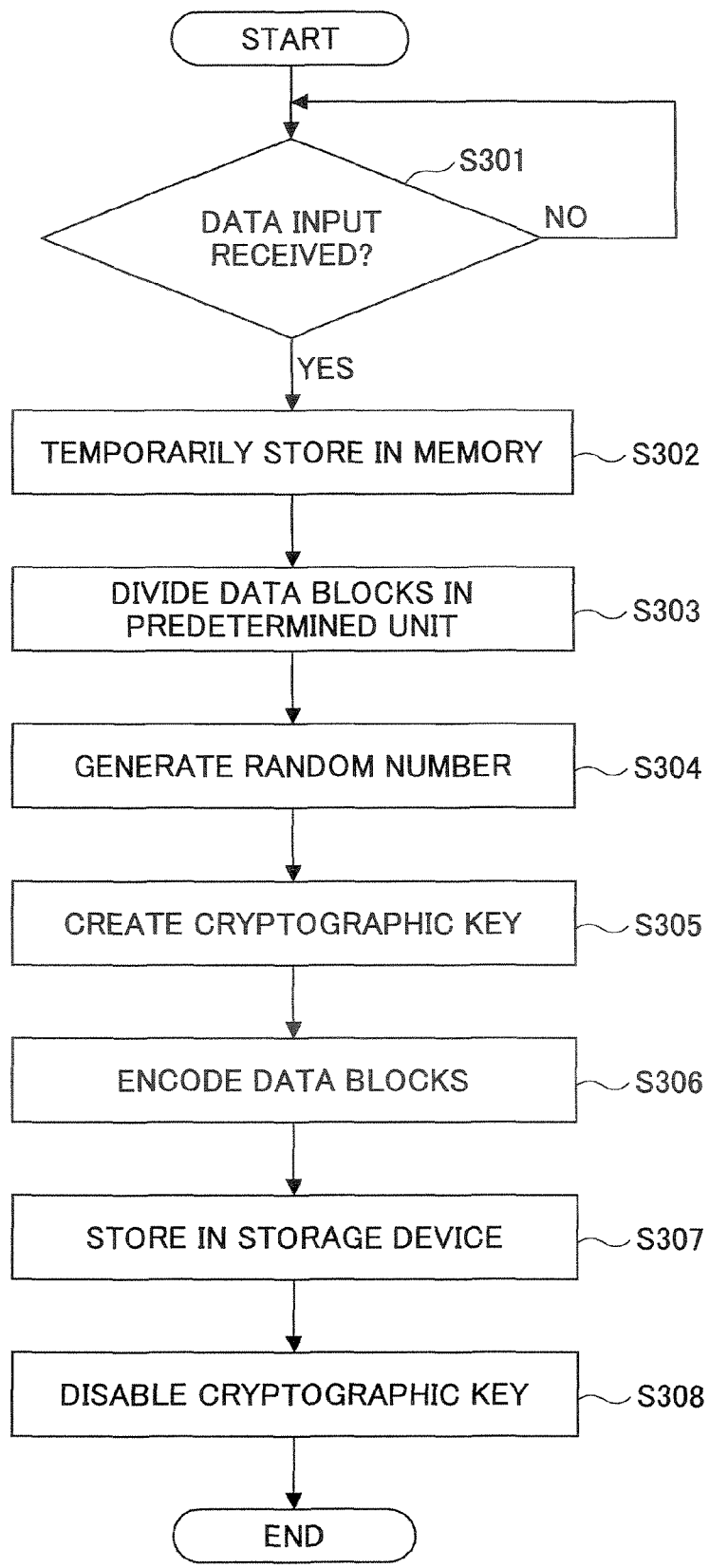
FIG. 3 is a flowchart showing a procedure of a data encoding process for operations.

Next, a procedure of a data encoding process performed on operations is described. FIG. 3 is a flowchart showing the procedure of the data encoding process performed on operations. In this case, operations are performed by a copier or a scanner, for example. In FIG. 3, first, the process awaits until data input is received upon operations (step S301: loop of No). When the data input is received, (step S301: Yes), the memory 104 temporarily stores data (step S302). Then, the DMA controller 111 transfers the temporarily stored data to the RAID controller 112 without using the CPU 101. And, the RAID controller 112 divides data blocks in a predetermined unit in accordance with the number of storage devices (step S303).

While the data blocks divided in step S303 are transferred from the RAID controller 112 to the storage devices, the data blocks pass through the encoders provided to each storage device. The random number generators disposed on the encoders generate random numbers when the data blocks are received (step S304). Next, the encoders create each cryptographic key in each encoder (step S305) using the random numbers generated in the disposed random number generators. Then, the encoders encode the data blocks (step S306) using the created cryptographic keys.

Thereafter, the encoders transfer the encoded data blocks to the storage devices so as to store the encoded data blocks in the storage devices (step S307) In step S307, the data blocks are stored and the encoders disable the cryptographic keys created in step S305 (step S308), thereby ending the series of steps. In accordance with this, even when data encoding is performed upon operations, by generating random numbers in the encoders upon each operation, cryptographic keys differing in each encoder are created and data is encoded. Further, when operations are ended, the cryptographic keys created in each encoder are disabled, so that a possibility of interception of operations is reduced.

As mentioned above, according to the data encoding apparatus, data encoding method, data encoding program, and recording medium in embodiment 1, each storage device is provided with the encoder and the random number generator, so that it is possible to reduce time for encoding and decoding data. Further, encoding is performed in each encoder using the cryptographic key, so that it is possible to improve the security of data.

Embodiment 2

[Example of a Configuration of a Data Encoding Apparatus]

Figure 4:
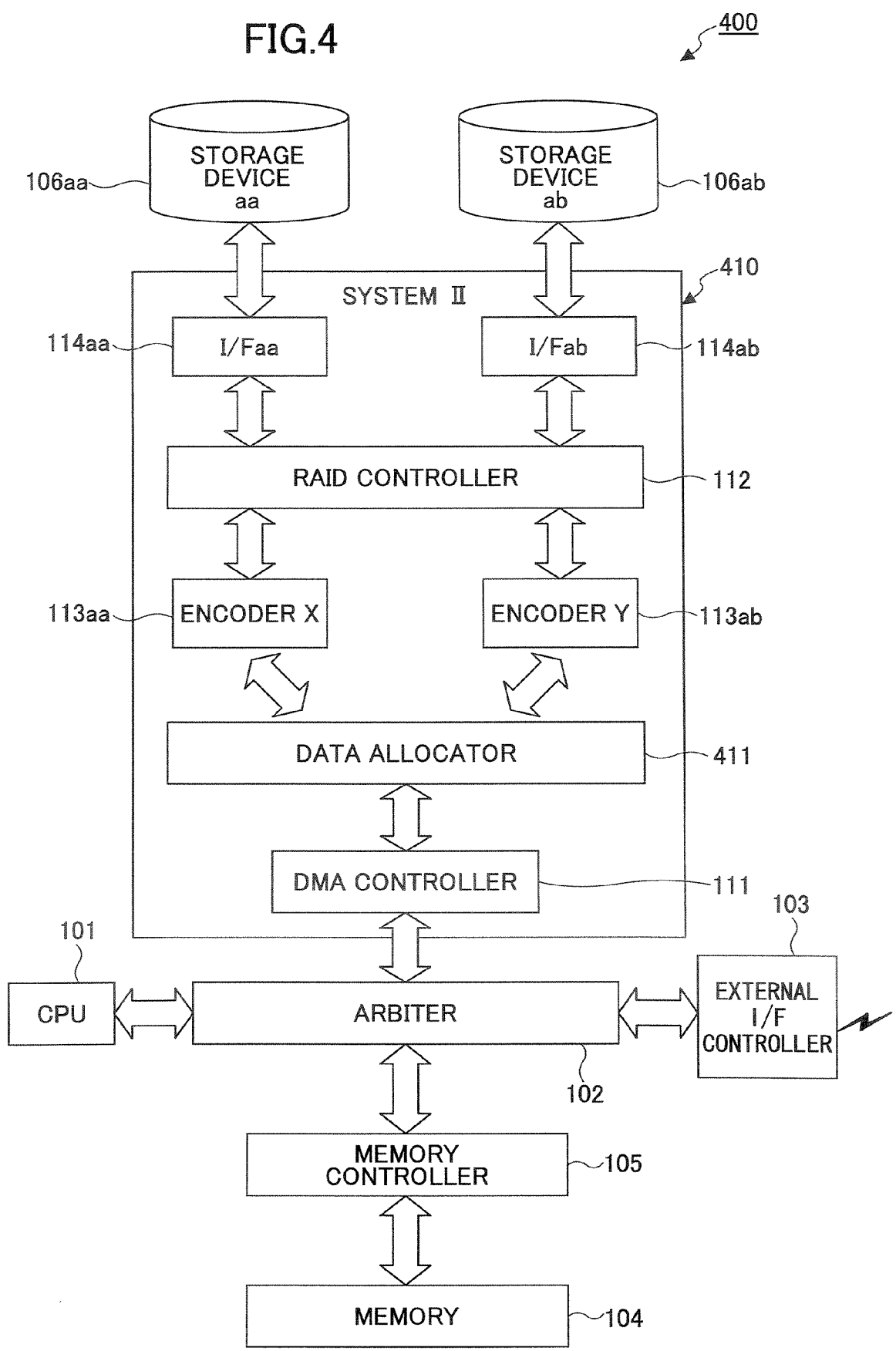
FIG. 4 is an illustration showing an example of a configuration of a data encoding apparatus according to embodiment 2.

Next, an example of a configuration of a data encoding apparatus 400 according to embodiment 2 is described. FIG. 4 is an illustration showing the example of the configuration of the data encoding apparatus 400 according to embodiment 2. In embodiment 2, the system I 110 in the data encoding apparatus 100 according to embodiment 1 is changed to a system II 410. The system II 410 is different from the system I 110 according to embodiment 1 in that a data allocator 411 is provided and the steps of the encoder X 113aa and the encoder Y 113ab are switched. In addition, in embodiment 2, the same elements are indicated by the same reference numerals and description thereof is omitted.

In FIG. 4, the data encoding apparatus 400 according to embodiment 2 includes the CPU 101, the arbiter 102, the external I/F controller 103, the memory 104, the memory controller 105, the storage device aa 106aa, the storage device ab 106ab, and the system II 410. The system II 410 includes the DMA controller 111, the RAID controller 112, the encoder X 113aa, the encoder Y 113ab, the I/F aa 114aa, the I/F ab 114ab, and the data allocator 411. Each of the constituent elements 101 to 410 is connected via a bus. In addition, the number of storage devices, the number of encoders, the number of I/F are arbitrary and the number of I/F is not less than that of storage devices. Thus, the number of encoders may not be the same as that of storage devices.

[Process of the Data Allocator]

Figure 5:
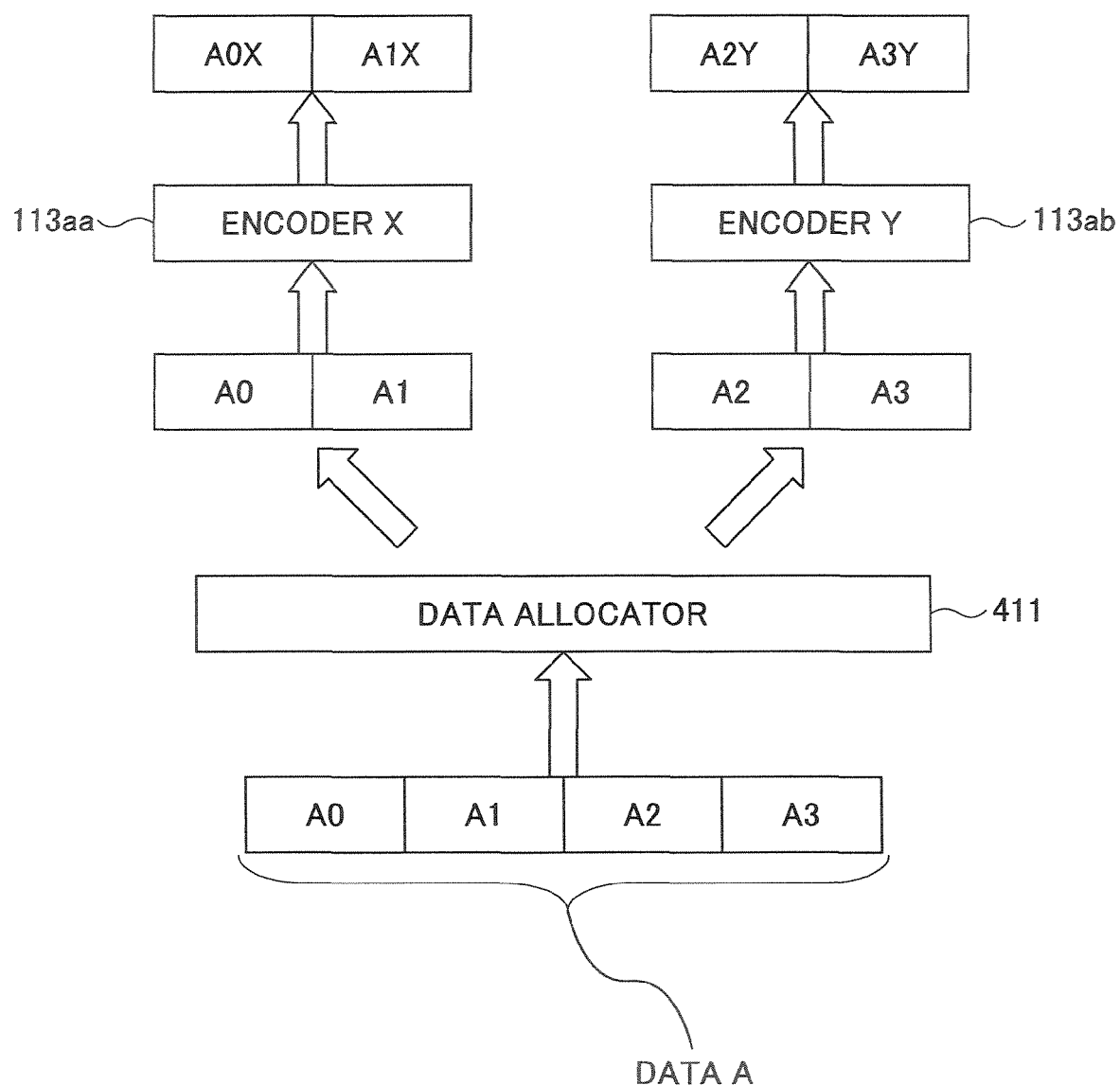
FIG. 5 is an illustration showing a process of a data allocator.

Next, a process of the data allocator 411 is described. FIG. 5 is an illustration showing the process of the data allocator 411. The data allocator 411 realizes a data allocation function for sequentially allocating received data in accordance with the number of encoders that has been set. In FIG. 5, the data allocator 411 allocates data A to the encoder X 113aa and the encoder Y 113ab. In FIG. 5, data A is divided into four data blocks, namely, data blocks A0 to A3. The data blocks are sequentially arranged as data block A0, data block A1, data block A2, and data block A3. When the sequence is changed, it is impossible to read the data.

In FIG. 5, the encoder X 113aa and the encoder Y 113ab are connected, so that the data allocator 411 sequentially allocates the received data A to the two encoders. Specifically, the data allocator 411 allocates a combination of data block A0 and data block A1 to the encoder X 113aa and a combination of data block A2 and data block A3 to the encoder Y 113ab. The allocated data is each encoded by the encoder X 113aa and the encoder Y 113ab. In the present invention, data block A0 and data block A1 encoded by the encoder X 113aa are described as data block A0X and data block A1X. In the same manner, data block A2 and data block A3 encoded by the encoder Y 113ab are described as data block A2Y and data block A3Y.

Next, an encoding procedure of the data encoding apparatus 400 according to embodiment 2 is described. First, data input is received in the external I/F controller 103. The memory 104 temporarily stores the received data through control of the memory controller 105. The DMA controller 111 transfers the temporarily stored data to the data allocator 411 without using the CPU 101. Next, the data allocator 411 allocates the data in accordance with the number of encoders. The encoder X 113aa and the encoder Y 113ab each encodes the allocated data using each cryptographic key. The encoded data is transferred to the RAID controller 112. The RAID controller 112 divides the data in a predetermined unit in accordance with the number of storage devices and transfers the divided data blocks to the storage device aa 106aa and the storage device ab 106ab.

In the description of FIG. 5, the data allocated by the data allocator 411 is encoded, and then the encoded data is distributed to each storage device by the RAID controller 112, so that the number of encoders may not be the same as that of storage devices. In proportion as the number of encoders is increased, maintenance of data security is further improved. In accordance with this, users are capable of changing the number of storage devices in their preference, so that it is possible to deal with various workflows.

A decoding procedure of the data encoding apparatus 400 is performed in reverse order of the encoding procedure. When the data encoding apparatus 400 receives a decoding request, the RAID controller 112 sequentially extracts the data blocks stored in each storage device. The extracted data blocks are transferred from the storage devices to the RAID controller 112. Then, the encoders decode the data blocks by using the cryptographic keys used for encoding each data block, the data blocks being sequentially collected in the RAID controller 112. The data allocator 411 sequentially collects the decoded data blocks. Thus, the data collected in the data allocator 411 is read out as pre-encoded data.

[Data Transfer Process Between the Same System Configurations]

Figure 6:
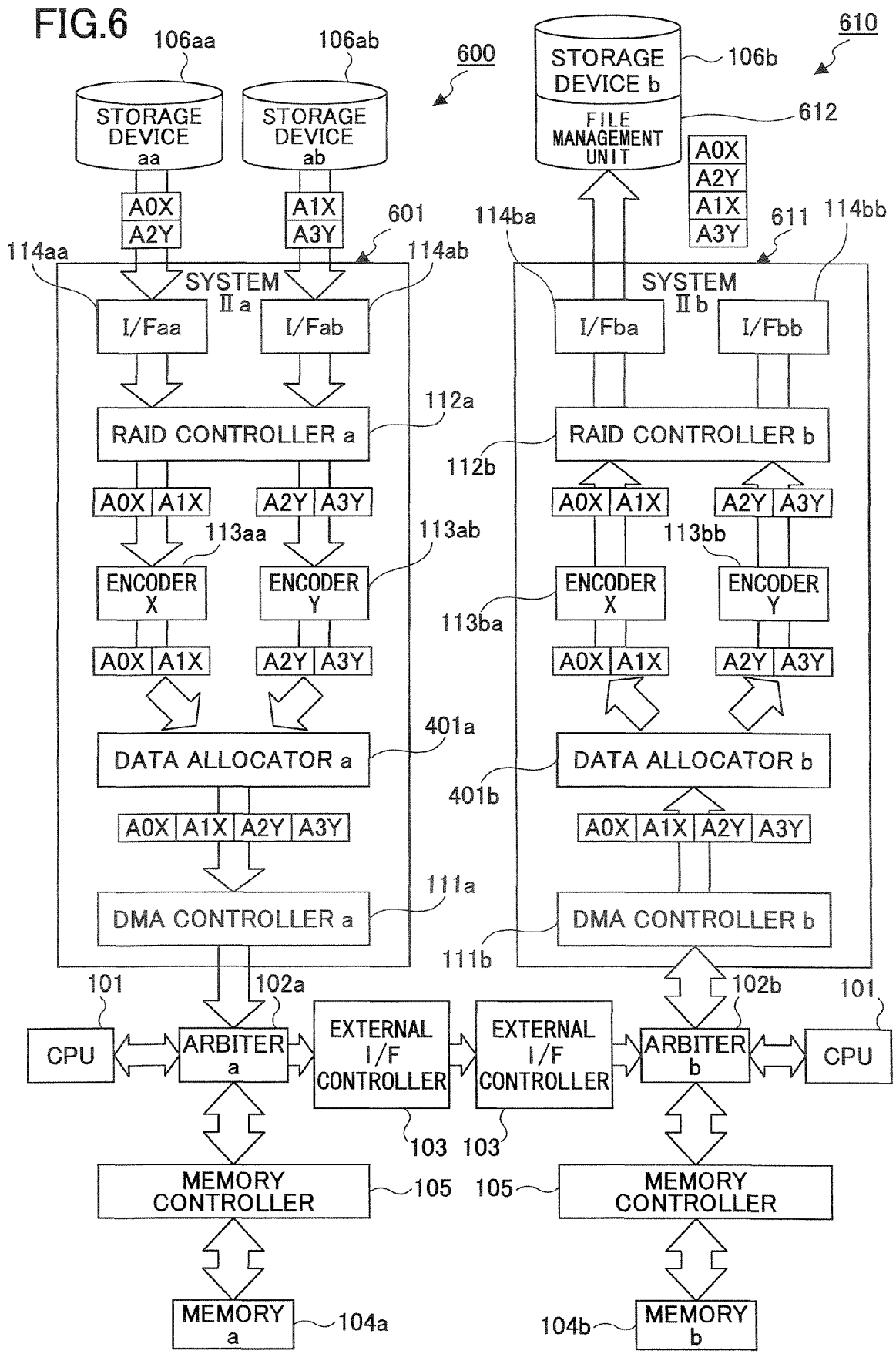
FIG. 6 is an illustration showing a data transfer process between the same system configurations.

Next, a data transfer process between the same system configurations is described. FIG. 6 is an illustration showing the data transfer process between the same system configurations. FIG. 6 shows the data transfer process between the data encoding apparatuses 400 according to embodiment 2. In FIG. 6, data stored in a data encoding apparatus a600 is transferred to a data encoding apparatus b610. In this case, a system IIa 601 included in the data encoding apparatus a600 has the same system configuration as a system IIb 611 included in the data encoding apparatus b610 to which the data is transferred. The data encoding apparatus a600 is different from the data encoding apparatus b610 only in the number of storage devices.

Further, in FIG. 6, the encoder X 113aa included in the system IIa 601 and an encoder X 113ba included in the system IIb 611 perform encoding using the same cryptographic key X. In the same manner, the encoder Y 113ab included in the system IIa 601 and an encoder Y 113bb included in the system IIb 611 perform encoding using the same cryptographic key Y. In FIG. 6, in the data encoding apparatus a600, data block A0X and data block A2Y are stored in the storage device aa 106aa and data block A1X and data block A3Y are stored in the storage device ab 106ab.

Figure 7:
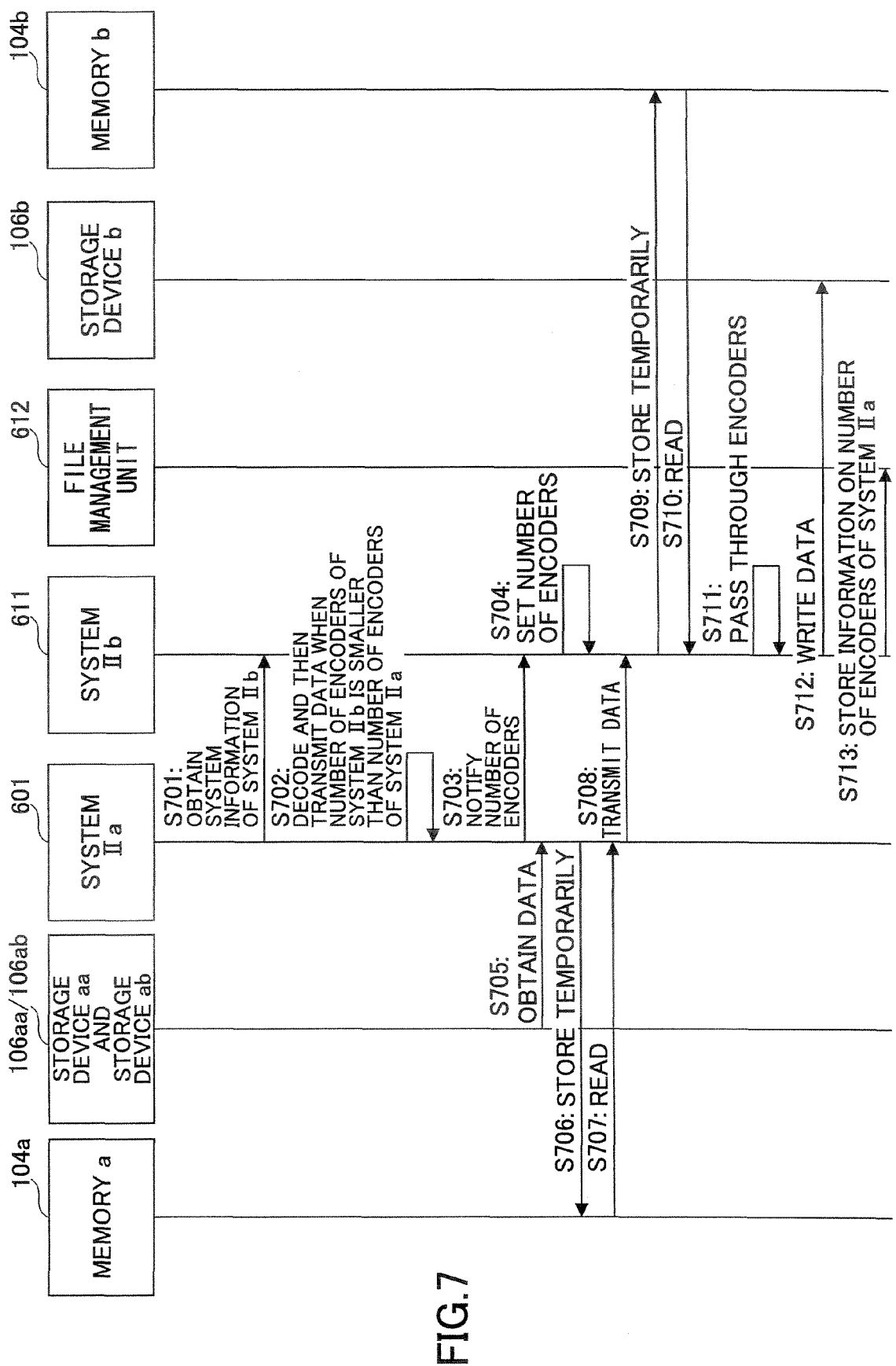
FIG. 7 is a sequence diagram showing a data transfer process between the same system configurations.

FIG. 7 is a sequence diagram showing the data transfer process between the same system configurations. In FIG. 7, first, the system IIa 601 obtains system information of the system IIb 611 (step S701). In this case, the system information refers to identification information for identifying the system configuration and information on the number of encoders of the recipient system. Based on the information on the number of encoders included in the system information obtained in step S701, the process judges whether the number of encoders of the system IIb 611 is smaller than the number of encoders of the system IIa 601. When encoded data blocks are transferred through the encoder, only those data blocks encoded with a cryptographic key used by the encoder so as to perform encoding are capable of passing passed through the encoder.

Thus, when the number of encoders of the data recipient system is smaller than the number of encoders of the data sender system, the number of types of the cryptographic key is smaller in the recipient system, so that the encoded data blocks have those incapable of passing through the encoder. Thus, it is impossible to transfer the data to the storage device. In this case, it is required that the data be once decoded and transferred to the recipient system, and then the recipient system perform the encoding process on the data. In FIG. 7, when the number of encoders of the system IIb 611 is smaller than the number of encoders of the system IIa 601, the data is decoded and then transmitted (step S702). On the other hand, when the number of encoders of the system IIb 611 is larger than the number of encoders of the system IIa 601, it is possible to transfer the data while the data is encoded. The following describes the data transfer process for transferring data while the data is encoded according to embodiment 2 of the present invention.

Next, the system IIa 601 notifies the number of encoders to the system IIb 611 (step S703). In the system IIb 611, the number of encoders of the system IIa 601 is set (step S704). On the other hand, in the system IIa 601, after the number of encoders is notified in step S703, data stored in the storage device aa 106aa and the storage device ab 106ab is obtained (step S705). Specifically, first, the data blocks extracted by a RAID controller a 112a from the storage device aa 106aa and the storage device ab 106ab are divided into a combination of data block A0X and data block A1X encoded in the encoder X 113aa and a combination of data block A2Y and data block A3Y encoded in the encoder Y 113ab. The divided data blocks each passes through the relevant encoder.

Next, a data allocator a 401a sequentially obtains the combinations of data blocks that have passed through the encoders, so that it is possible to obtain encoded data A without changing the sequence of the data blocks of the original data A. Thus, when data A extracted from the system IIa 601 is transferred directly to the system IIb 611, the sequence of the data blocks may not be changed. Then, a memory a 104a temporarily stores the extracted data A (step S706). In step S706, the temporarily stored data is read (step S707), and then the data is transmitted to the system IIb 611 (step S708).

Upon data transmission to the system IIb 611, first, the external I/F controller 103 of the data encoding apparatus b610 receives data. The received data is temporarily stored in a memory b 104b (step S709). The temporarily stored data is read (step S710) and transferred to the system IIb 611. In accordance with the number of encoders, a data allocator b 401b sequentially allocates the data transferred to the system IIb 611. The data blocks pass through the encoders each managing the cryptographic key used for performing encoding (step S711). Thus, the combination of data block A0X and data block A1X passes through the encoder X 113ba. In the same manner, the combination of data block A2Y and data block A3Y passes through the encoder Y 113bb.

In step S711, the combinations of data blocks that have passed through the encoders are collected in a RAID controller b 112b. The RAID controller b 112b divides the data blocks in a predetermined unit in accordance with the number of storage devices and transfers the divided data blocks to each storage device. In FIG. 7, the number of storage devices is one, namely, only a storage device b 106b is disposed, so that the RAID controller b 112b transfers all the data blocks to the storage device b 106b. The storage device b 106b subsequently writes the transferred data (step S712). Further, in addition to the operation in step S712, the storage device b 106b stores information on the number of encoders set in step S704 in a file management unit 612 disposed on the storage device b 106b (step S713).

Although the number of the storage devices is one, namely, only the storage device b 106b is disposed in step S712, the present invention is not limited to this. For example, when two storage devices are disposed, the combinations of data blocks are divided into a combination of data block A0X and data block A2Y and a combination of data block A1X and data block A3Y, and then each combination is stored in the storage devices.

As mentioned above, according to the data encoding apparatus, data encoding method, data encoding program, and recording medium in embodiment 2, it is possible to set the number of storage devices regardless of the number of encoders. Thus, it is possible to change the number of storage devices in accordance with an intended use of users, so that it is possible to extend workflows for the users. Further, when data is transferred between the systems II 410, the data is transferred while encoded, so that it is possible to transfer the data while maintaining security of the data. Thus, it is possible to improve the security of the data.

Embodiment 3

[Change Procedure of a Data Transfer Process Based On System Information]

Figure 8:
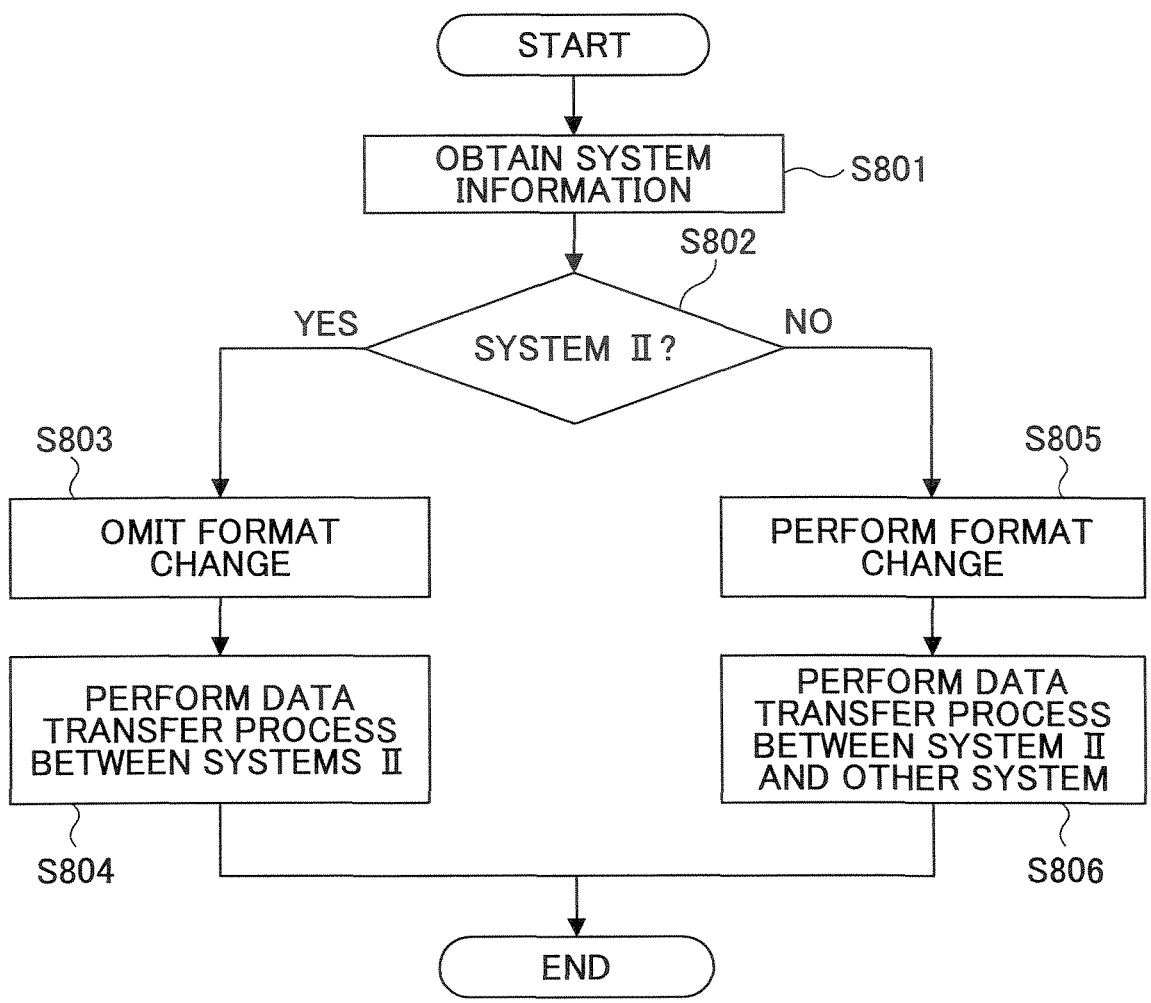
FIG. 8 is a flowchart showing a change procedure of a data transfer process based on system information.

Next, a change procedure of a data transfer process based on system information is described. FIG. 8 is a flowchart showing the change procedure of the data transfer process based on system information. FIG. 8 illustrates a case where a system included in a data encoding apparatus in one of a sender or a recipient upon data transfer is the system II 410 disposed on the data encoding apparatus 400 according to embodiment 2. In FIG. 8, first, the data encoding apparatus 400 obtains system information of the other data encoding apparatus connected thereto (step S801). In step S801, the data encoding apparatus 400 realizes an obtainment function for obtaining the system information of other data encoding apparatus connected thereto. Further, in step S801, the process judges whether the counterpart has the system II 410 based on the identification information included in the obtained system information (step S802). In step S802, the process uses the identification information and realizes a judgment function for judging whether the sequence of data blocks of the data encoding apparatus corresponds to the sequence of data blocks of the other data encoding apparatus connected thereto.

In step S802, when the counterpart has the system II 410 (step S802: Yes), the data encoding apparatus 400 omits a format change (step S803) and performs a data transfer process between the systems II 410 as described in FIG. 7 (step S804). On the other hand, in step S802, when the counterpart does not include the system II 410 (step S802: No), the data encoding apparatus 400 performs the format change (step S805) so as to change the sequence of the data blocks. In accordance with this, the data transfer process is performed between the system II 410 and other system (step S806). In addition, FIG. 9 illustrates the format change and the system II provided with a format changer in detail.

[Data Transfer Process Between Different System Configurations]

Figure 9:
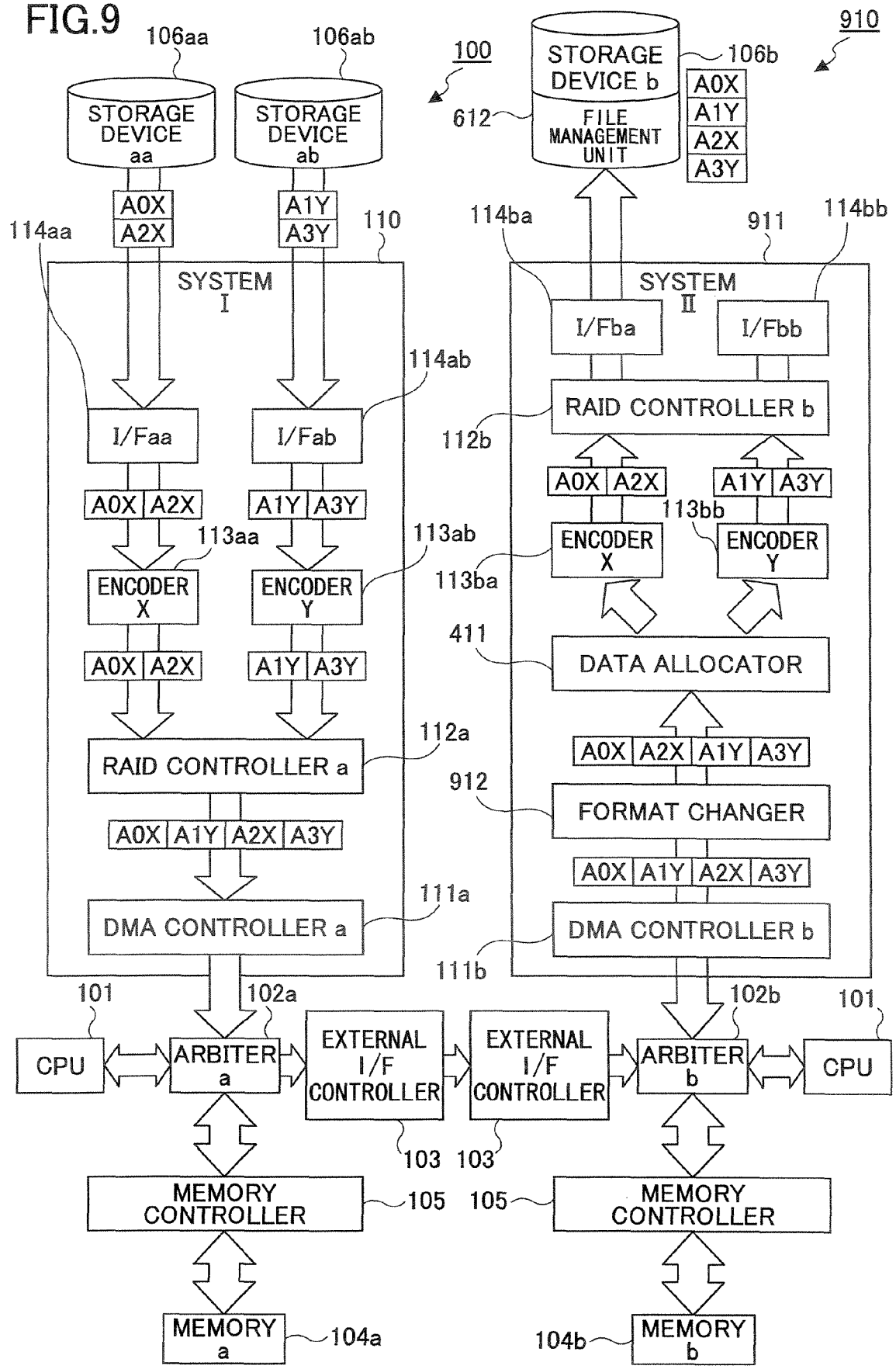
FIG. 9 is an illustration showing a data transfer process between different system configurations.

FIG. 9 is an illustration showing a data transfer process between different system configurations. FIG. 9 illustrates the data transfer process between a system II 911 and the above-mentioned system. The data transfer process in FIG. 9 is different from the data transfer process in FIG. 6 in that the system configuration of the data encoding apparatus 100 configured as a sender includes the system I 110 and that the system configuration of a data encoding apparatus 910 configured as a recipient includes a format changer 912 in the system II 911. In this case, the format changer 912 realizes a format change function for changing the sequence of data blocks. For example, in the data encoding apparatus 100 according to embodiment 1, when the system configurations are the same and the numbers of the storage devices are the same, it is possible to transfer data while the data is encoded. Thus, it is necessary to change the sequence of data blocks when data of the data encoding apparatus 100 according to embodiment 1 is transferred to the data encoding apparatus 400 according to embodiment 2 while the data is encoded.

Specifically, in the data encoding procedure in the data encoding apparatus 100 according to embodiment 1, the RAID controller a 112a divides the data blocks in a predetermined unit. Accordingly, data blocks passed through the encoder X 113aa are a combination of data block A0 and data block A2. In the same manner, data blocks passed through the encoder Y 113ab are a combination of data block A1 and data block A3. In accordance with this, the data blocks stored in the storage device aa 106aa are data block A0X and data block A2X and the data blocks stored in the storage device ab 106ab are data block A1Y and data block A3Y.

Next, when the encoded data is extracted, the sequence of data blocks is sequentially represented as data block A0X, data block A1Y, data block A2X, and data block A3Y. Accordingly, when the data is transferred to the system II 911 in this sequence of the data blocks, the data allocator 411 allocates the data based on the number of encoders, so that the data blocks allocated to the encoder X 113ba is a combination of data block A0X and data block A1Y, for example. As a result, the data blocks do not pass through the encoder X 113ba. The same operation is performed in encoder Y 113bb. In view of this, in the data transfer procedure, it is necessary to perform a format change using the format changer 912 before the processing by the data allocator 411. By performing the format change, the sequence of the data blocks is changed such that the data blocks are capable of passing through each encoder.

Figure 10:
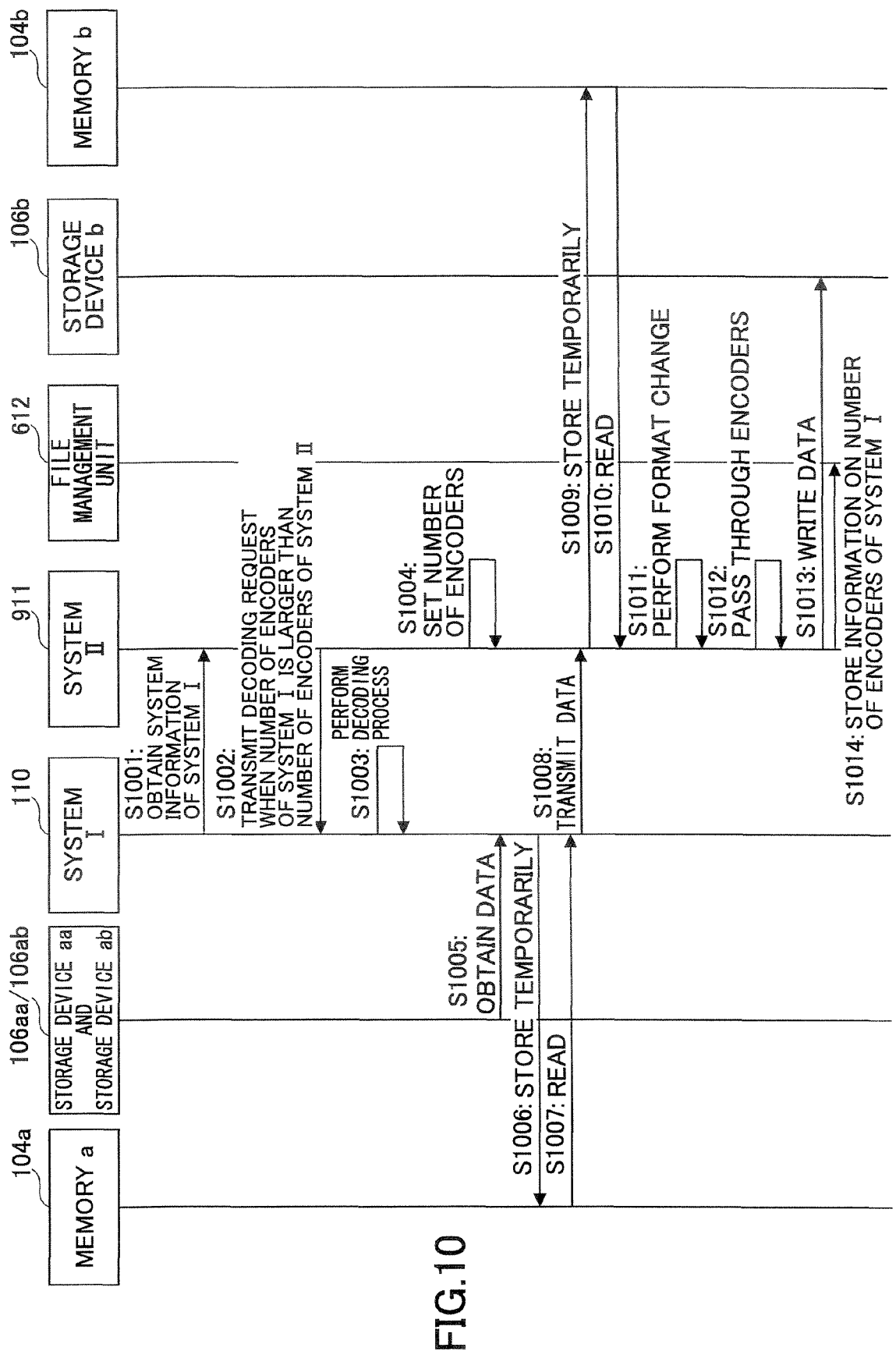
FIG. 10 is a sequence diagram showing a data transfer process between different system configurations.

FIG. 10 is a sequence diagram showing the data transfer process between different system configurations. In FIG. 10, the data is transferred from the system I 110 to the system II 911. In FIG. 10, first, the system II 911 obtains the system information of the system I 110 (step S1001). When the number of encoders of the system I 110 is larger than the number of encoders of the system II 911 based on information on the number of encoders included in the system information of the system I 110 obtained in step S1001, a decoding request is transmitted (step S1002). The system I 110 receives the decoding request and performs a data decoding process (step S1003). On the other hand, when the number of encoders of the system II 911 is larger than the number of encoders of the system I 110, it is possible to transfer the data while the data is encoded. The following describes the data transfer process for transferring data while the data is encoded according to embodiment 3.

Next, the system II 911 sets the number of encoders of the system I 110 obtained in step S1001 (step S1004). On the other hand, in the system I 110, the RAID controller a 112a obtains the data stored in the storage device aa 106aa and the storage device ab 106ab (step S1005). Specifically, the RAID controller a 112a extracts the combination of data block A0X and data block A2X from the storage device aa 106aa and the combination of data block A1Y and data block A3Y from the storage device ab 106ab. Each combination of the extracted data blocks passes through the encoders managing the cryptographic keys used for encoding and is collected in the RAID controller a 112a. The memory a 104a temporarily stores the collected data blocks (step S1006). In step S1006, the temporarily stored data is read (step S1007) and the read data is transmitted to the system II 911 (step S1008).

Upon transmitting the data to the system II 911, first, the external I/F controller 103 of the data encoding apparatus 910 receives the data. The received data is temporarily stored in the memory b 104b (step S1009). Further, the temporarily stored data is read (step S1010) and transferred to the system II 911. Then, the format changer 912 performs a format change on the data transferred to the system II 911 (step S1011). In other words, the sequence of the data blocks is changed to be a sequence of combinations in accordance with the cryptographic keys used for encoding. Next, the data allocator 411 allocates the sequence-changed data blocks. Then, the data blocks each passes through the encoders managing the cryptographic keys used for encoding (step S1012).

In step S1012, the combinations of data blocks that have passed through the encoders are collected in the RAID controller b 112b. Then, the RAID controller b 112b divides the data blocks in a predetermined unit in accordance with the number of storage devices and transfers the divided data blocks to each storage device. The storage device b 106b subsequently writes the transferred data (step S1013). Further, in addition to the operation in step S1013, the storage device b 106b stores information on the number of encoders set in step S1004 in the file management unit 612 disposed on the storage device b 106b (step S1014).

[Decoding Process on Data Blocks Transferred While Decoded]

Figure 11:
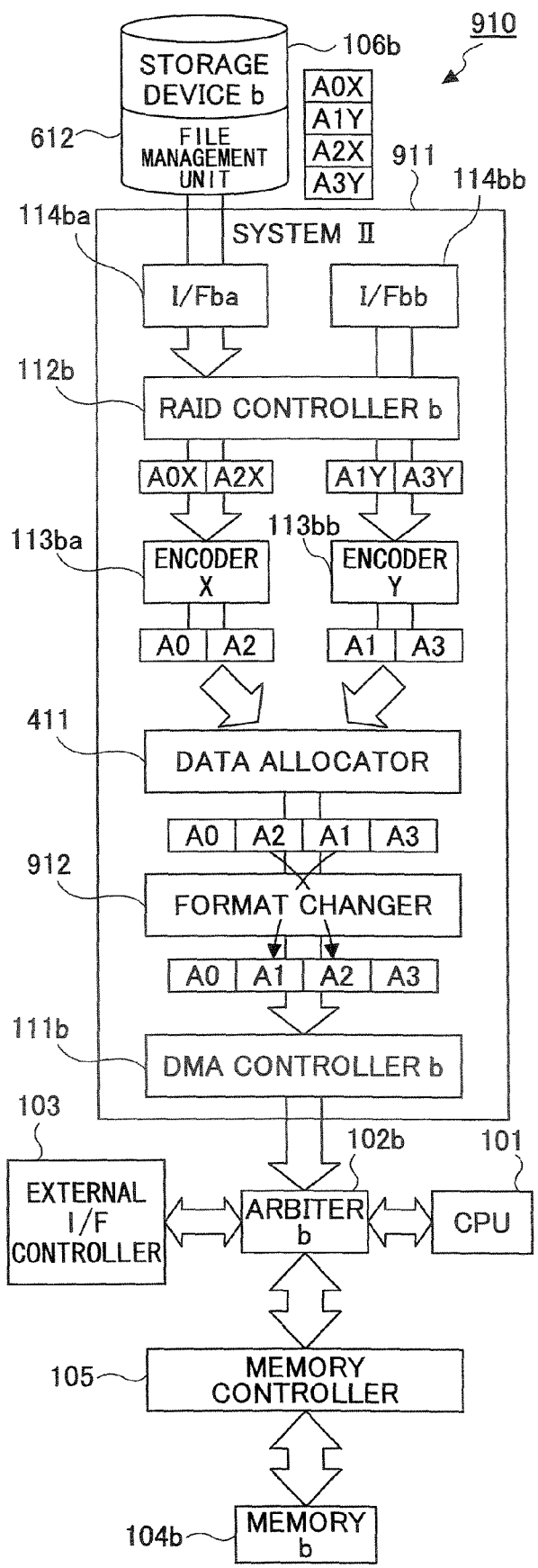
FIG. 11 is an illustration showing a process for decoding data blocks transferred from system 1 while encoded.

Next, regarding the data transfer process between different system configurations described with reference to FIGS. 9 and 10, a decoding process performed on data blocks transferred while decoded is described. FIG. 11 is an illustration showing the process for decoding data blocks transferred from system 1 while encoded. FIG. 12 is a sequence diagram showing the process for decoding data blocks transferred from system 1 while encoded. In FIG. 12, first, information on the number of encoders of the system I 110 is obtained (step S1201). Based on the information on the number of encoders of the system I 110 obtained in step S1201, the number of encoders of the system used for encoding is set (step S1202). On the other hand, the RAID controller b 112b extracts data blocks in combinations each corresponding to the cryptographic keys used for encoding (step S1203). Then, the encoders corresponding to the number of encoders that has been set each decodes the extracted data blocks (step S1204).

The decoded data blocks are extracted as collections of data blocks by the data allocator 411. The sequence of data blocks is sequentially represented as data block A0, data block A2, data block A1, and data block A3. In this status, the sequence of the data blocks is different from that of the original data A. Thus, the format changer 912 performs a format change (step S1205) so as to change the sequence of the data blocks. In accordance with this, the sequence of the data is sequentially represented as data block A0, data block A1, data block A2, and data block A3. The data is temporarily stored in the memory b 104b as the original data A (step S1206) and the data is prepared for reading (step S1207).

As mentioned above, according to the data encoding apparatus, data encoding method, data encoding program, and data recording medium in embodiment 3, it is possible to transfer data while the data is encoded between systems having different methods for dividing data. Thus, it is possible to transfer data stored in the above-mentioned system to the novel system II 911 while maintaining security. This extends workflows for the users.

In addition, it is possible to realize the data encoding method described in the present embodiment when a program prepared in advance is executed using a computer such as a personal computer, workstation, and the like. The program is recorded in a computer-readable recording medium such as a hard disk, flexible disk, CD-ROM, MO, DVD, and the like. And, the program is executed when it is read out from the recording medium using the computer. The program may be a transmission medium capable of distribution via a network such as the Internet.

As mentioned above, the data encoding apparatus, data encoding method, data encoding program, and data recording medium according to the present invention is useful for devices handling highly-confidential data, especially for digital multi-functional devices.

The present invention is not limited to the specifically disclosed embodiment, and variations and modifications may be made without departing from the scope of the present invention.

The present application is based on Japanese priority application No. 2006-034264 filed Feb. 10, 2006, the entire contents of which are hereby incorporated herein by reference.

What is claimed is:

1. A data encoding apparatus comprising:
an arbitrary number of different storage units;
a data transfer control unit dividing input data into a number of data blocks equal to the arbitrary number of storage units and transferring each respective data block to a respective storage unit; and
encoding units having a same number as the storage units, the encoding units encoding, while the data blocks are transferred by the data transfer control unit, the data blocks using a plurality of cryptographic keys equaling the number of storage units, each respective cryptographic key being different and being used to encode a respective data block,
wherein
each storage unit stores the data blocks encoded by the encoding units, and
the encoding units are connected to the corresponding storage units via corresponding buses.

2. The data encoding apparatus according to claim 1, wherein
the encoding unit includes:
a random number generating unit creating a cryptographic key by generating random numbers for each storage unit.

3. A data encoding apparatus comprising:
an arbitrary number of encoding units;
a storage unit;
a data allocation unit allocating input data to a number of data blocks equal to the arbitrary number of encoding units and encoding the data blocks using a plurality of cryptographic keys equaling the number of encoding units, each respective cryptographic key being different and being used to encode a respective data block, the data blocks being allocated by the data allocation unit; and
a data transfer control unit transferring the data blocks to the storage unit, the data blocks being encoded by the encoding units,
wherein the storage unit
stores the data blocks transferred by the data transfer control unit, and
sequentially writes the data blocks transferred by the data transfer control unit according to information on the arbitrary number of encoding units in a file management unit disposed in the storage unit.

4. The data encoding apparatus according to claim 3, wherein
a number of the storage units is arbitrary, and
the data transfer control unit transfers the data blocks in a predetermined data block unit to each storage unit in accordance with the number of the storage units.

5. The data encoding apparatus according to claim 3, including:
an information obtainment unit obtaining information of other data encoding apparatus;
a judgment unit judging, in an encoding procedure included in the information, whether a sequence of the data blocks of the data encoding apparatus corresponds to a sequence of data blocks of the other data encoding apparatus based on the information of the other data encoding apparatus obtained by the information obtainment unit; and
a reception unit receiving the data blocks encoded by the other data encoding apparatus, wherein
the data transfer control unit transfers the information obtained by the information obtainment unit and the data blocks received by the reception unit to the storage unit without change when the judgment unit judges that the sequence of the data blocks of the data encoding apparatus corresponds to the sequence of the data blocks of the other data encoding apparatus.

6. The data encoding apparatus according to claim 4, including:
an information obtainment unit obtaining information of other data encoding apparatus;
a judgment unit judging, in an encoding procedure included in the information, whether a sequence of the data blocks of the data encoding apparatus corresponds to a sequence of data blocks of the other data encoding apparatus based on the information of the other data encoding apparatus obtained by the information obtainment unit; and
a reception unit receiving the data blocks encoded by the other data encoding apparatus, wherein
the data transfer control unit transfers the information obtained by the information obtainment unit and the data blocks received by the reception unit to the storage unit without change when the judgment unit judges that the sequence of the data blocks of the data encoding apparatus corresponds to the sequence of the data blocks of the other data encoding apparatus.

7. The data encoding apparatus according to claim 5, including:
a format change unit changing the sequence of the data blocks received by the reception unit when the judgment unit judges that the sequence of the data blocks of the data encoding apparatus is different from the sequence of the data blocks of the other data encoding apparatus.

8. The data encoding apparatus according to claim 6, including:
a format change unit changing the sequence of the data blocks received by the reception unit when the judgment unit judges that the sequence of the data blocks of the data encoding apparatus is different from the sequence of the data blocks of the other data encoding apparatus.

9. A data encoding method comprising:
- data transfer control for dividing input data into a number of data blocks equal to an arbitrary number of storage units and transferring each respective data block to a respective storage unit;
- data encoding for encoding, via data encoding units while the data blocks are transferred by the data transfer control unit, the data blocks using a plurality of cryptographic keys equaling the number of storage units, each respective cryptographic key being different and being used to encode a respective data block; and
- data storing for storing each of the data blocks encoded in the data encoding in the arbitrary storage units, wherein the encoding units are connected to the corresponding storage units via corresponding buses.

10. A data encoding method comprising:
- data allocation for allocating input data to a number of data blocks equal to an arbitrary number of encoding units;
- data encoding for encoding the data blocks using a plurality of cryptographic keys equaling the number of encoding units, each respective cryptographic key being different and being used to encode a respective data block, the data blocks being allocated in the data allocation;
- data transfer control for transferring the data blocks encoded in the data encoding to a storage unit; and
- data storing
  - for storing the data blocks transferred in the data transfer control in the storage unit, and
  - sequentially writing the data blocks transferred by the data transfer control unit according to information on the arbitrary number of encoding units in a file management unit disposed in the storage unit.

11. A non-transitory computer-readable recording medium on which a computer-readable data encoding program is recorded, the program comprising:
- data transfer control for dividing input data into a number of data blocks equal to an arbitrary number of storage units and transferring each respective data block to a respective storage unit;
- data encoding for encoding, via data encoding units while the data blocks are transferred by the data transfer control unit, the data blocks using a plurality of cryptographic keys equaling the number of storage units, each respective cryptographic key being different and being used to encode a respective data block; and
- data storing for storing each of the data blocks encoded in the data encoding in the arbitrary storage units, wherein the encoding units are connected to the corresponding storage units via corresponding buses.

12. A non-transitory computer-readable recording medium on which a computer-readable data encoding program is recorded, the program comprising:
- data allocation for allocating input data to a number of data blocks equal to an arbitrary number of encoding units;
- data encoding for encoding the data blocks using a plurality of cryptographic keys equaling the number of encoding units, each respective cryptographic key being different and being used to encode a respective data block, the data blocks being allocated in the data allocation;
- data transfer control for transferring the data blocks encoded in the data encoding to a storage unit; and
- data storing
  - for storing the data blocks transferred in the data transfer control in the storage unit, and
  - sequentially writing the data blocks transferred by the data transfer control unit according to information on the arbitrary number of encoding units in a file management unit disposed in the storage unit.

* * * * *